United States Patent [19]

Berdan

[11] Patent Number: 5,511,967
[45] Date of Patent: Apr. 30, 1996

[54] SELF-CONTAINED GAS INJECTOR

[75] Inventor: Karl Berdan, Midland, Canada

[73] Assignee: PEBRA GmbH Paul Braun, Altbrach, Germany

[21] Appl. No.: 195,508

[22] Filed: Feb. 14, 1994

[51] Int. Cl.$^6$ .......................... B29C 44/00; B29C 45/40
[52] U.S. Cl. .................. 425/533; 264/328.12; 264/334; 264/572; 425/444; 425/537; 425/546; 425/556
[58] Field of Search .................................. 425/130, 533, 425/546, 556, 562, 563, 564, 537, 444; 264/572, 328.12, 334

[56] References Cited

U.S. PATENT DOCUMENTS

| 4,474,717 | 10/1984 | Hendry | 264/572 |
| 4,917,594 | 4/1990 | Gellert et al. | 264/572 |
| 5,047,183 | 9/1991 | Eckardt et al. | |
| 5,135,703 | 8/1992 | Hunerberg et al. | 264/572 |
| 5,198,238 | 3/1993 | Baxi | 264/572 |
| 5,273,707 | 12/1993 | Carroll | 264/572 |
| 5,282,730 | 2/1994 | Daniels et al. | 425/556 |
| 5,354,523 | 10/1994 | Slal | 264/572 |

FOREIGN PATENT DOCUMENTS

| 1391794 | 4/1975 | United Kingdom . |
| 2217644 | 11/1989 | United Kingdom . |

OTHER PUBLICATIONS

Publication—Cinpres Ltd.; FIG. 8—Typical Nozzle Assembly.
Publication—Cinpres Ltd.; FIG. 9—Typical Assy on Tool Split Line.

Primary Examiner—Jay H. Woo
Assistant Examiner—Joseph Leyson
Attorney, Agent, or Firm—Keck, Mahin & Cate

[57] ABSTRACT

A gas assisted injection molding machine includes an injector valve assembly secured to the clamping plate and having an elongate supply duct extending through the core and into the mold cavity. The duct supports a valve member for sliding movement and is itself supported in the core by an ejector sleeve. The ejector sleeve moves with the ejection mechanism to force molded articles off the end of the supply duct.

10 Claims, 7 Drawing Sheets

SELF-CONTAINED GAS INJECTOR

TITLE OF THE INVENTION

The present invention relates to gas-assisted injection molding machines and to injectors for use with such machines.

DESCRIPTION OF PRIOR ART

Gas-assisted injection molding is a well-known technique in which gas is injected into a mold after the molding material has been supplied to the mold cavity. As the gas is injected, the material within the interior of the cavity is expelled through a vent leaving a wall around the periphery of the cavity. In this way, a hollow article may be molded leading to significant reductions in weight and material.

Injection molding machines typically have a backing plate or clamping plate on which is mounted a core and a cavity plate. The core and cavity plate are separable along a common plane and the cavity is formed on the common plane so that upon opening of the mold, the molded article may be removed. Removal of the article is assisted by an ejector mechanism which typically includes pins movable normal to the common plane after the mold has opened so that the article is elevated from the core and may readily be removed.

The gas is injected by gas injectors that protrude into the cavity so as to inject the gas within the article to be molded. These are typically mounted on the core. In this arrangement, however, servicing of an injector becomes difficult as it is located between the core and the clamp plate and must also accomodate movement of the ejection mechanism. Accordingly, in order to service an injector, it is frequently necessary to disassemble the molding machine, which may weigh several hundred pounds, which results in significant cost and down time for the machine.

A further problem with existing designs is that the mounting of the injectors on the core requires a large cavity to accomodate the injectors. The size of the cavity significantly weakens the mold, particularly where multiple channels are formed in the molded product requiring multiple injectors. The weakening of the mold of course adversely affects the quality of the molded product and may require strengthening of the mold which further complicates the installation of the injector. As such, there is a need for a molding machine in which the installation of the injector is simplified.

A further problem associated with existing designs of injectors is the relatively large diameter of the injector body. This may be attributed to the nozzle design in which the operating components are located adjacent to the nozzle tip. The relatively large nozzle diameter creates a substantial void in the molded article and in practical terms limits the projection of the nozzle into the mold. This has a disadvantage in that the gas is injected into the cavity adjacent a wall which may cause breakout or imperfect molding of the article.

As such, therefore, there is a need to provide an injector nozzle which not only simplifies installation but also permits injection of the gas into the interior of the cavity.

It is therefore an object of the present invention to obviate or mitigate the above disadvantages.

SUMMARY OF THE INVENTION

In general terms, the present invention provides a gas-assisted injection molding machine in which an injection valve assembly has a body mounted on the clamping plate. A gas supply duct extends from the clamping plate through the core and into the cavity. In the preferred embodiment, the body is mounted on the opposite side of the clamping plate to the core to facilitate removal of the valve assembly. In this way, the valve assembly may be removed without disturbing the clamping plates and, because the operating components of the valve assembly may be located in the body, the apertures in the core are significantly reduced.

It is also preferred to locate the gas supply duct within a sleeve that is slidable relative to the core. The sleeve is connected to the ejector mechanism so that upon ejection of the molded component, the sleeve slides in the core and assists in pushing the component from the mold.

BRIEF DESCRIPTION OF THE DRAWINGS

Embodiments of the present invention will now be described by way of example only with reference to the accompanying drawings, in which.

DESCRIPTION OF THE PREFERRED EMBODIMENT

Figure 1:
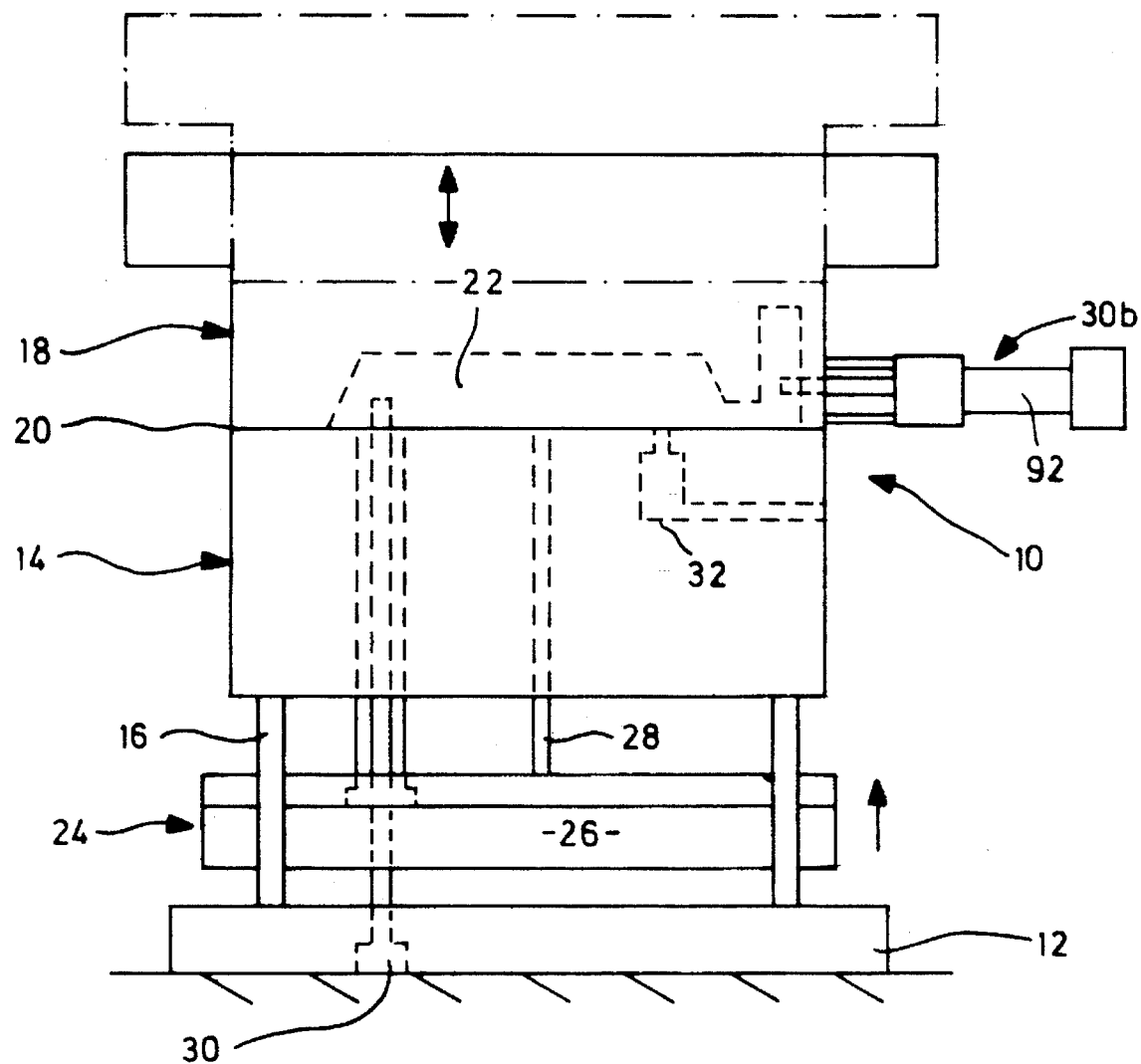
FIG. 1 is a schematic representation of an injection molding machine.

Referring therefore to FIG. 1, an injection molding machine 10 includes a clamping plate or base plate 12 that may be secured to a suitable mounting structure (not shown). A core 14 is supported on the clamping plate 12 by a support structure 16 so as to be spaced from but fixed relative to the clamping member 12. A cavity plate 18 is mounted on the core 14 so as to be movable relative thereto between the closed position as shown in solid lines and an open position shown in chain dot lines in FIG. 1. The core 14 and cavity plate 18 abut along a common plane of separation 20 in the closed position.

A mold cavity 22 is formed between the core 14 and the cavity 18 to define the exterior surface of an article to be molded. Typically, the core 14 will have a substantially planar surface defining the back of the article to be molded with contoured surfaces being formed in the cavity plate 18. More complicated shapes may of course be formed by having contoured surfaces formed in both the core 14 and the cavity plate 18.

An ejector mechanism 24 is located between the clamping plate 12 and core 14 and includes an ejector plate assembly 26 slidably mounted on the support 16 for movement relative to the core 14. Ejector pins 28 are secured to the ejector plate assembly 26 and extend through the core 14 to terminate at the surface of the mold cavity 22.

With the cavity plate 18 in the open position, the ejector plate assembly 26 may be advanced toward the core 14 and cause the ejector pins 28 to engage the molded article and eject it from the core 14.

A gas injection valve assembly 30 is positioned in the core 14 to supply pressurized gas to the interior of the cavity 22. Gas will expel material from the cavity through a vent valve 32 and thereby permit a hollow article to be molded. Multiple voids may be formed in the article requiring a plurality of assemblies 30, some of which (as indicated at 30b) may be mounted on the side of the cavity plate 18.

Figure 2:
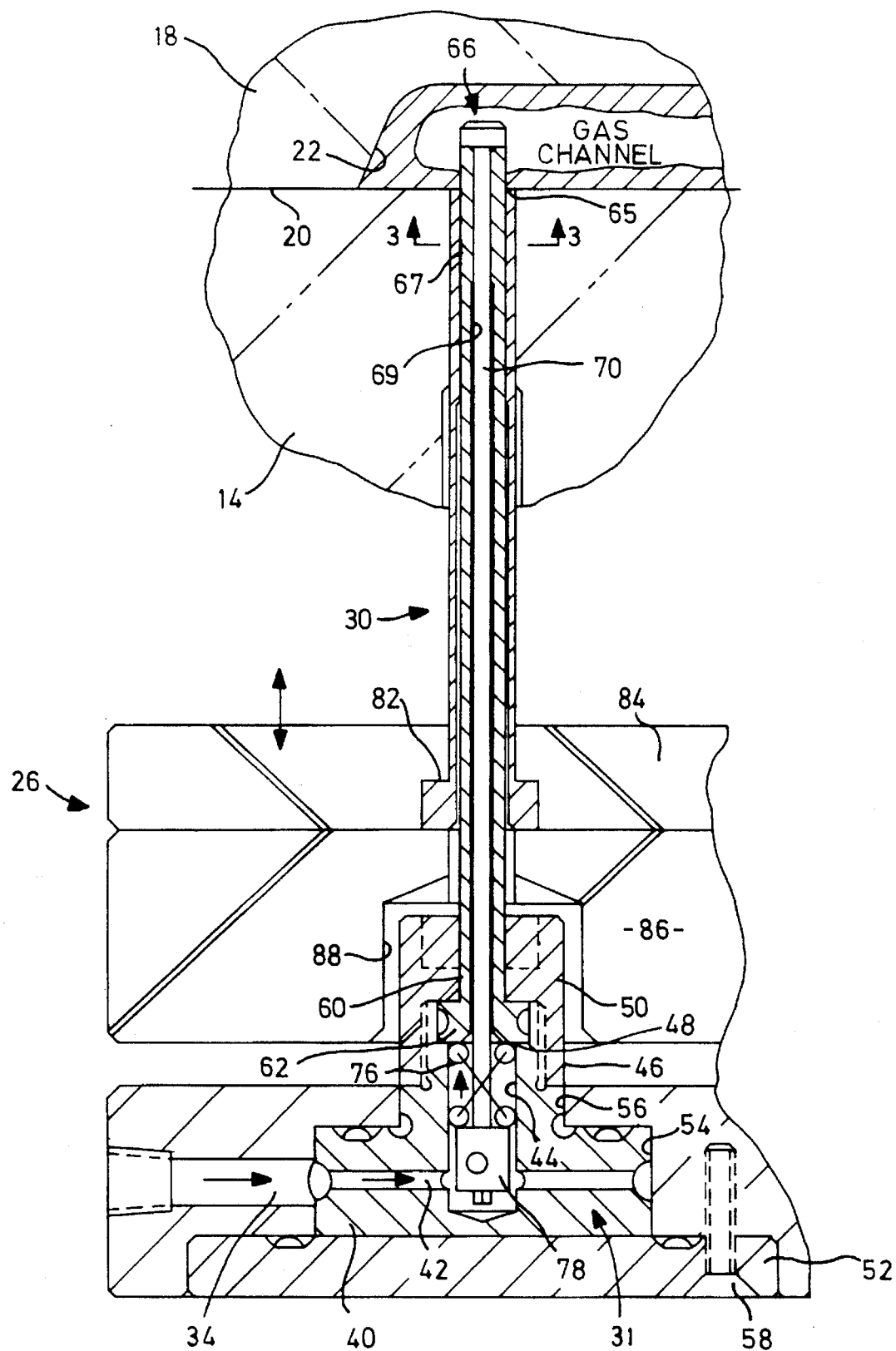
FIG. 2 is a sectional view on an enlarged scale of a portion of the injection molding machine shown in FIG. 1.

The valve assembly 30 is seen in further detail in FIG. 2. Referring therefore to FIG. 2, the valve assembly 30 includes a manifold 31 having a circular base 40 with an internal passageway 42 aligned with a conduit 34 in the clamping plate 12 and communicating with a chamber 44. The chamber 44 extends into a cylindrical boss 46 formed on the base 40.

The base 40 of valve assembly 30 is located within a counterbore 54 provided in the opposite side of the clamping plate 12 to the core 14. A throughbore 56 extends from the counterbore 54 through the clamping plate 12 to snugly receive the protrusion 46. Countersunk screws 58 secure a retaining plate 52 to the clamping plate 12 to hold the base 40 on the clamping plate 12.

An elongate supply duct 60 is secured to the boss 46 by means of a cap 50 that traps an integral shoulder 62 between the end 48 of boss 46 and the underside of cap 50. The duct 60 extends through the ejector plate assembly 24 and core 14 to project into the cavity 22 and is formed with a tubular wall 63 that defines an internal bore 64. Gas from the passage 42 may flow through chamber 44 and along the bore 64 into cavity 22.

Figure 3:
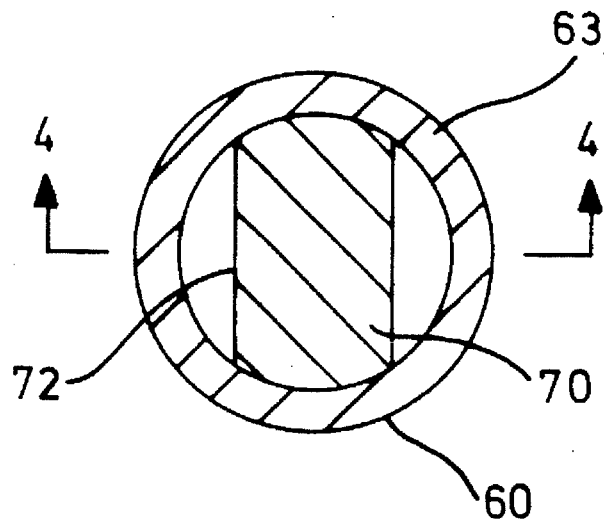
FIG. 3 is a view on the line 3—3 of FIG. 1.
Figure 4:
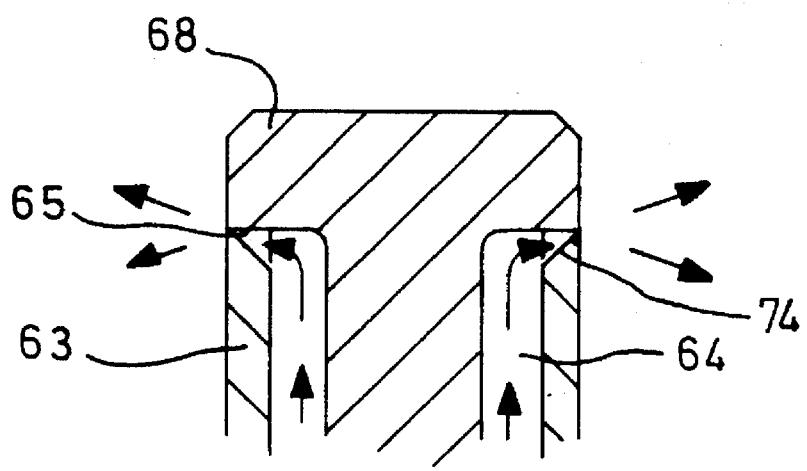
FIG. 4 is a view on the line 4—4 of FIG. 3.

A valve member 66 is slidably mounted within the bore 64 and as can best be seen in FIGS. 3 and 4, includes a cylindrical head 68 carried on an elongate needle 70. The head 68 extends radially over an end face 65 of the duct 60 to seal the internal conduit 64.

The inner surface of wall 63 includes a cylindrical portion 67 adjacent the end face 65 and a diametrically enlarged portion 69 on the balance of its length.

As shown in FIG. 3, the needle 70 is generally cylindrical to conform to the inner surface of the cylindrical portion of wall 63 and has a pair of flats 72 formed to allow passage of gas along the bore 64. The needle 70 is radially spaced from the enlarge portion 60 to provide a continuous passageway from chamber 44 to the head 68. As shown in FIG. 4, a pair of inclined slots 74 are provided at diametrically opposed locations opposite the flats 72 to direct jets of gas generally radially into the cavity 22. The needle 70 is thus slidable supported within the duct with its movement limited by abutment of the head 68 with the end face 65 of the duct. The head 68 is biased against the end face of the duct 60 by a spring 76 disposed about the needle within the chamber 44. The spring 76 acts against the underside of shoulder 62 and against a piston 78 secured to the needle 70.

The duct 60 is supported within the core 14 within an ejector sleeve 80 that is slidable mounted within the core. The ejector sleeve is provided with an enlarged flange 82 at its lower end that is trapped between an ejector retainer plate 84 and the ejector plate 86 that together form the ejector plate assembly 26. The ejector sleeve 80 is thus connected to the ejector plate assembly 26 to move with it through the core 14. The ejector plate 86 is also formed with a recess 88 that receives the boss 46 when the ejector plate assembly 24 is retracted.

In operation, the cavity plate 18 and core 14 abut in the closed position and molding material is introduced into the cavity 22. At this time, the ejector plate assembly 24 is retracted so that the ejector sleeve 80 is flush with the plane of separation 20. The extreme end of supply duct 60 and head 68 of valve member 66 project upwardly from the separation plane into the cavity 22. Molding material is injected into the cavity 22 in a known manner and, once the cavity is full, pressurized gas is introduced through the conduit 34 provided in the clamping plate 12 to the internal duct 42.

The gas passes through the bore 64 of supply duct 60 and its pressure acting on head 68 and piston 78 lifts the valve member to move the head 68 away from the end face 65 of supply duct 60. The gas is thus injected into the interior of the cavity 22 and voids the interior of the material from the cavity 22. A thin wall structure is left in the cavity to define the outer shape of the molded article.

Figure 5:
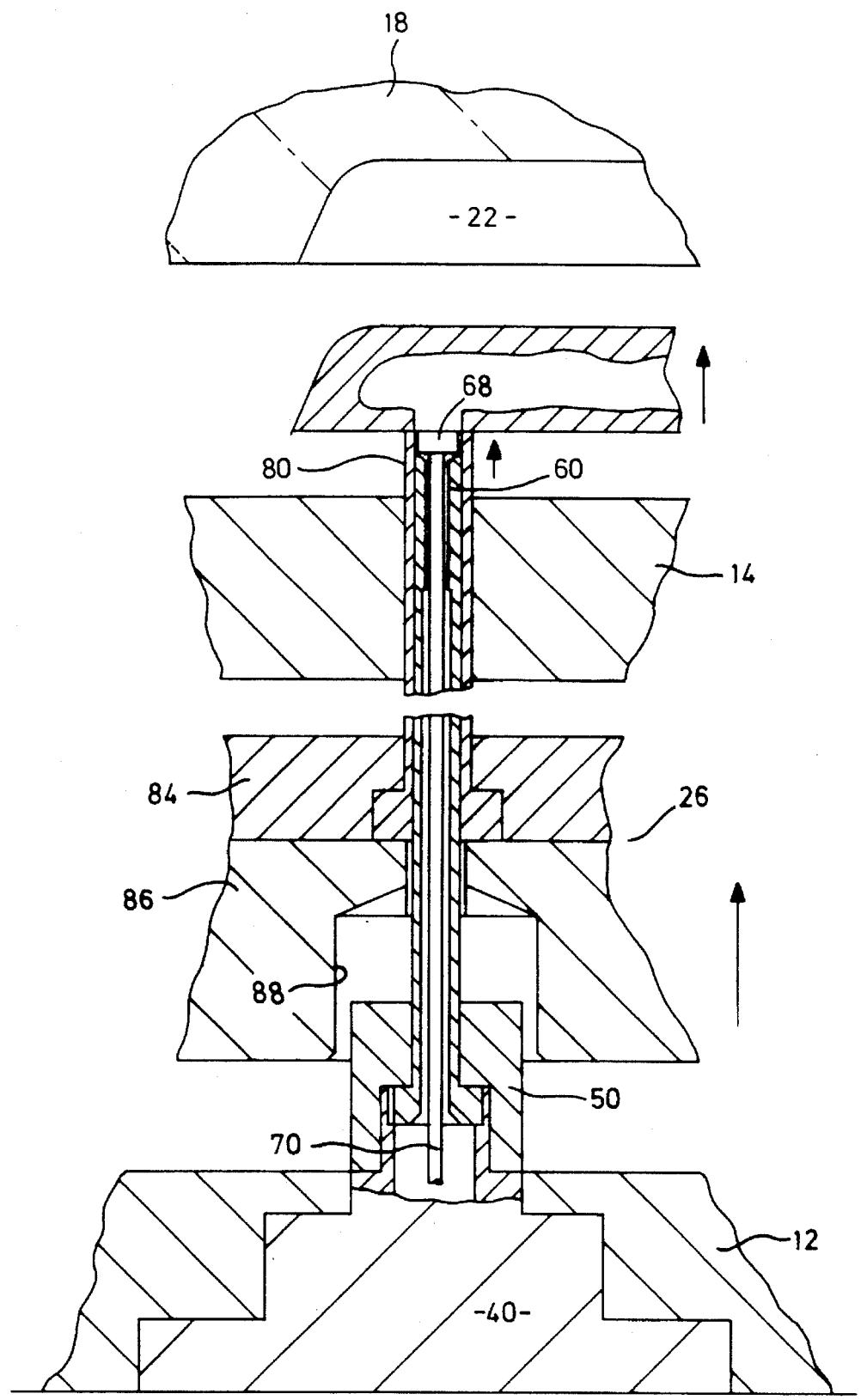
FIG. 5 is a view similar to FIG. 2 showing the assembly in an alternate position.

Upon completion of the molding process, the pressure is removed from the chamber 44 and the head 68 returns into sealing engagement with the end face 65 of the duct 60 under the influence of the spring 76. The cavity plate 18 is then opened, leaving the molded article on the core 14. The ejector plate assembly 26 of ejector mechanism 24 is then advanced towards the core 14 causing the ejector pins 28 to engage the molded article. At the same time, the ejector sleeve 80 is advanced through the core 14 and pushes the molded article from the tubular wall 63 through the supply duct 60. As shown in FIG. 5, the supply duct 60 is retained in situ on the clamping plate 12 and the sleeve 80 advanced until it is flush with the end of the supply duct 60 to release fully the molded article. The article is then removed and the cavity plate 18 returned to a closed position ready to mold the next article. The ejector mechanism 24 also returns plate assembly 26 to the retracted position, leaving the supply duct 60 protruding into the cavity.

It will be noted that the body 40, chamber 44 and boss 46 are accomodated on the clamping plate 12 requiring only the relatively small diameter supply duct 60 to project upwardly through the core 14. This arrangement reduces the size of the bore in the core that is necessary to accomodate the supply duct and also permits the relatively small diameter supply duct to project fully into the cavity. The hole formed in the molded article by the supply duct is sufficiently small not to affect the overall integrity of that article and the positioning of the ejector sleeve 80 about the supply duct also facilitates removal of the molded article with minimum risk of damage to the molded article and the duct.

If it becomes necessary to service the valve assembly 30, it is simply necessary to remove the retaining screws 58 and withdraw the valve assembly 30 from the rear of the clamping plate 12. The supply duct 60 may slide through the ejector sleeve 80, which is held in place by the ejector plate assembly 26, and which also serves as a guide to facilitate reinsertion of the valve assembly. The removal of the valve assembly therefore does not require disassembly of the molding machine 10.

Figure 6:
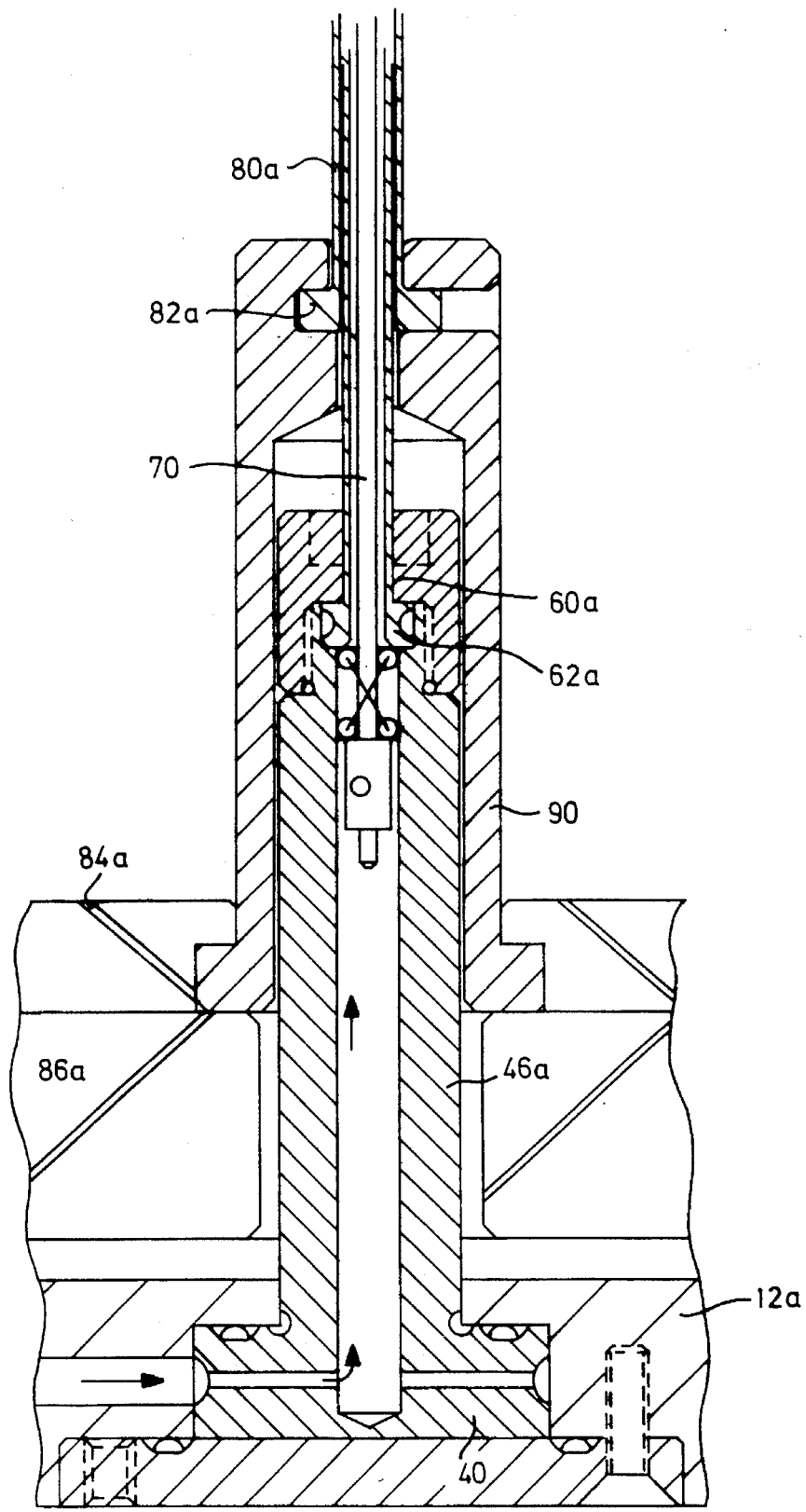
FIG. 6 is a view similar to FIG. 1 showing an alternate embodiment to accomodate the differently proportioned molding machines.

In some mold designs, there is a significant distance between the clamping plate 12 and the core 14. As can be seen from FIG. 6, the arrangement shown in FIG. 2 can readily be modified to accomodate different heights of core 14. In the embodiment shown in FIG. 6 where like components are identified with like numerals with a suffix "a" added for clarity, the boss 46a is elongated and the supply duct 60a supported at an elevated position relative to the clamping plate 12a. An extension member 90 is secured to the shoulder 82a of the ejector sleeve 80a and in turn is received and secured between the ejector retaining plate 84a and the ejector plate 86a. In this manner, the valve assembly 30a may be positioned adjacent to the underside of the core 14a to minimize the overall length of the needle 70a but at the same time the arrangement still permits extraction of the valve assembly 30a simply by removal of the securing screws 58.

The valve assembly 30 may also be utilized to provide voids within an article that can only be formed from the side of the cavity plate 18. Such an arrangement is shown in FIGS. 7 and 8 where similar components to those shown in FIGS. 1–5 are denoted by like reference numerals with a suffix "b" added for clarity.

Figure 7:
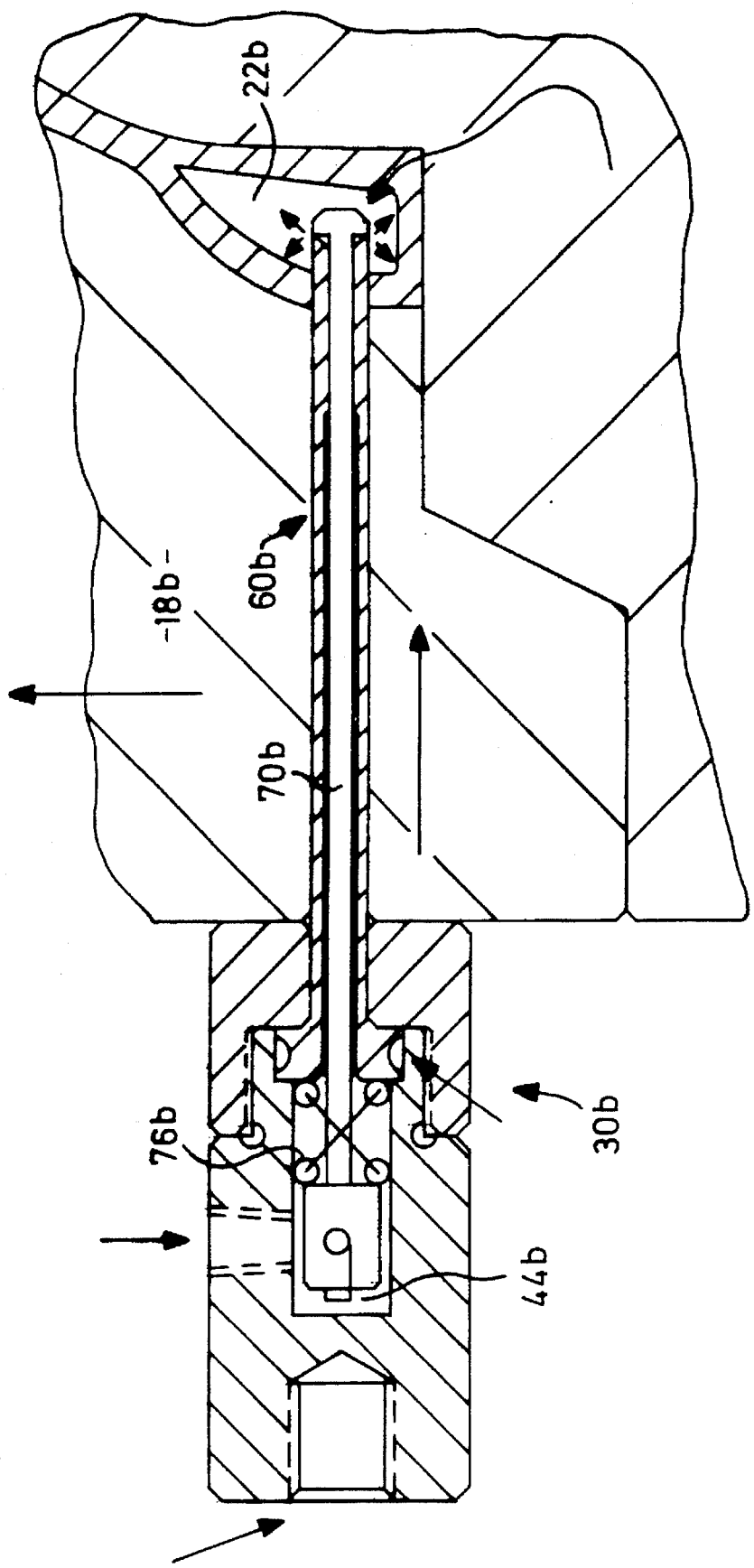
FIG. 7 is a section on the line 7—7 of FIG. 1 showing a further arrangement of gas injection valve.
Figure 8:
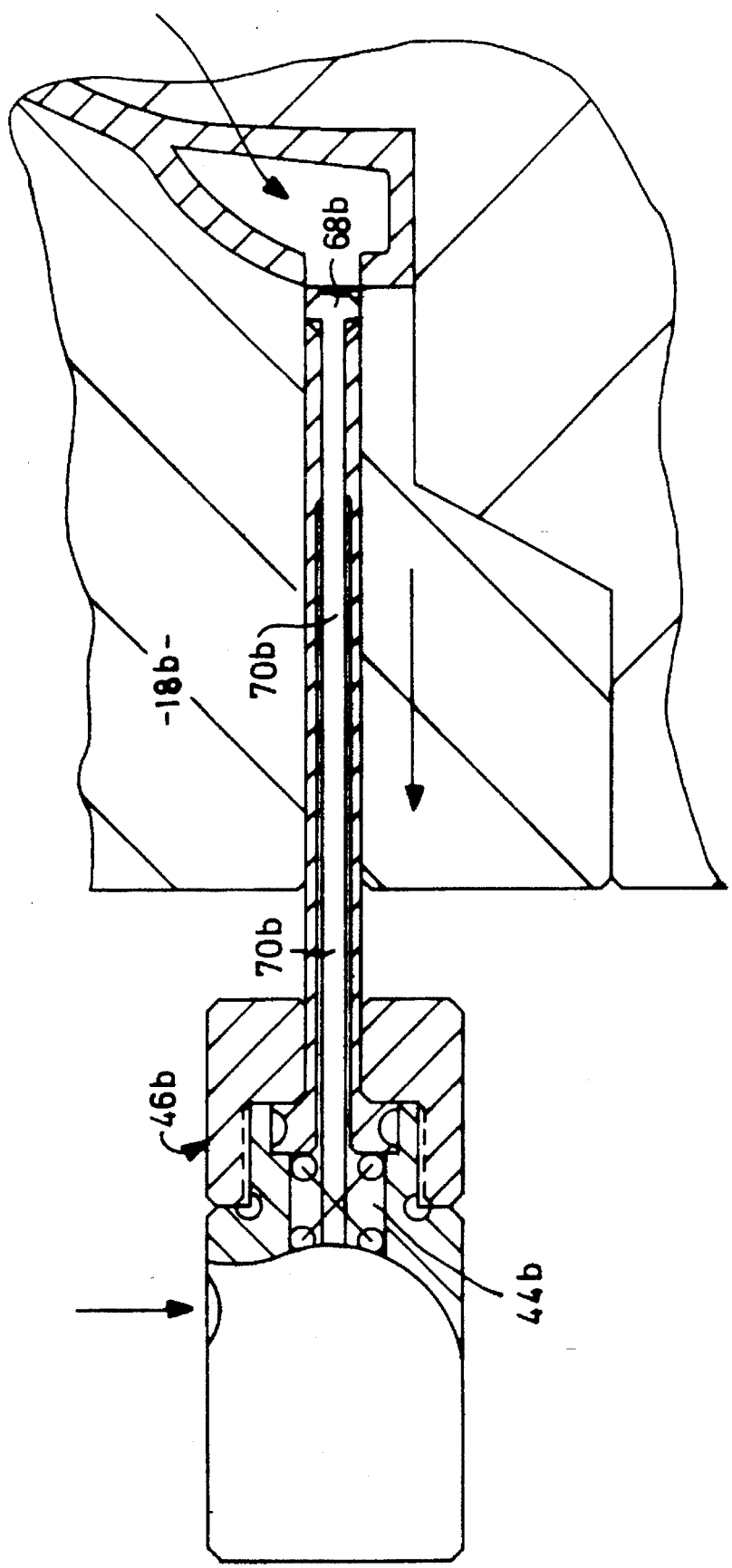
FIG. 8 is a view similar to FIG. 7 showing the components in an alternate configuration.

In the arrangement shown in FIGS. 7 and 8, the valve assembly 30b is secured to one end of a cylinder 92 indicated in FIG. 1 which may advance and retract the valve assembly relative to the cavity plate 18b. In the advance position shown in FIG. 7, the supply duct 60b extends into the cavity 22b to be effective to void the interior of the article. Once the material has been evacuated, the valve closes under the action of the spring 76b and the cylinder 92 retracts the supply duct 60b and needle as shown in FIG. 8. With this arrangement, the molded article is supported about the supply duct 60b by the walls of the cavity plate 18b and thus ensures that the duct can be extracted from the article without damage.

Once retracted, the cavity plate 18 may be opened, carrying the cylinder and valve assembly 30b with it, and the article ejected without interference from the valve assembly 30b. Again, however, the location of the chamber 44b and spring 76b remote from the distal end of the needle permits a relatively small diameter supply duct to be utilized and therefore protrude into the interior of the cavity.

We claim:

1. A gas assisted injection molding machine comprising a clamping plate, a core supported on said clamping plate in spaced relation thereto, a cavity plate juxtaposed on said core and movable relative thereto between a closed position in which a mold cavity is defined between said core and said cavity plate and an open position to allow removal of a molded component from said cavity, an ejector mechanism movable relative to said core to eject molded components from said cavity and including a sleeve slidably supported in said core and movable with said ejector mechanism relative to said core, and at least one gas injector valve assembly to inject gas into said mold cavity, said valve assembly comprising a manifold including a body mounted on said clamping plate on an opposite side thereof to said core and having an internal passageway connected to a source of pressurized gas, a supply duct secured to said manifold and extending from said passageway through said sleeve and into said cavity to provide a conduit extending from said passageway and into said cavity and a valve member slidably mounted in said conduit and having biasing means to bias said valve member to a closed position in which flow through said conduit is inhibited.

2. A molding machine according to claim 1 wherein said manifold body is located in a counterbore in said clamping plate.

3. A molding machine according to claim 2 wherein said manifold includes a boss extending from said body that projects through said clamping plate and said supply duct is connected thereto.

4. A molding machine according to claim 1 wherein said sleeve has a distal end that lies flush with a wall of said mold cavity when said ejector mechanism is retracted.

5. A molding machine according to claim 4 wherein said valve member includes a head extending radially over an end of said supply duct to terminate flush with said duct when in said closed position.

6. A molding machine according to claim 5 wherein said valve member includes an elongate needle connected to said head and extending along said conduit toward said manifold.

7. A molding machine according to claim 6 wherein said conduit and needle terminate in a chamber in said manifold and said biasing means is located in said chamber.

8. A molding machine according to claim 7 wherein said manifold includes a boss extending from said body that projects through said clamping plate and said chamber is located within said boss.

9. A molding machine according to claim 1 wherein said manifold includes a boss upstanding from said body with said supply duct being secured thereto, extending through a bore in said clamping plate whereby said injector valve assembly may be removed from said core by release of said body from said clamping plate and retraction of said boss through said bore.

10. A molding machine according to claim 9 wherein said body is located in a counterbore in said clamping plate.

* * * * *